United States Patent [19]

Stoll et al.

[11] Patent Number: 4,699,402

[45] Date of Patent: Oct. 13, 1987

[54] MOUNTING BOARD FOR FLUID POWER COMPONENTS

[76] Inventors: Kurt Stoll; Gerhard Hihn, both of Lenzhalde 72, 7300 Esslingen, Fed. Rep. of Germany

[21] Appl. No.: 811,486

[22] Filed: Dec. 20, 1985

[30] Foreign Application Priority Data

Dec. 22, 1984 [DE] Fed. Rep. of Germany ....... 3447263

[51] Int. Cl.4 .............................................. F16L 35/00

[52] U.S. Cl. ........................................ 285/26; 285/39; 285/137.1; 285/421; 285/423; 285/901; 285/364

[58] Field of Search ...................... 285/137.1, 364, 406, 285/423, 150, 38, 39, 901, 14, 421, 24, 25, 26, 27, 28, 29

[56] References Cited

U.S. PATENT DOCUMENTS

| | | | |
|---|---|---|---|
| 2,073,338 | 3/1937 | Burkee | 285/373 |
| 3,879,068 | 4/1975 | Stampfli | 285/406 X |
| 3,888,518 | 6/1975 | Delessert | 285/137.1 X |
| 3,930,674 | 1/1976 | Jonsson | 285/137.1 X |
| 4,080,752 | 3/1978 | Burge | 285/137.1 X |
| 4,082,324 | 4/1978 | Obrecht | 285/137.1 |
| 4,247,133 | 1/1981 | Moller | 285/137.1 X |
| 4,392,677 | 7/1983 | Hardouin | 285/137.1 |

FOREIGN PATENT DOCUMENTS

| | | | |
|---|---|---|---|
| 8203 | of 1908 | United Kingdom | 285/901 |
| 1438060 | 6/1976 | United Kingdom | 285/137.1 |

*Primary Examiner*—Dave W. Arola

*Attorney, Agent, or Firm*—McGlew and Tuttle

[57] ABSTRACT

Mounting boards for supporting and connecting fluid power components are secured together with dovetail clips to make up arrays with a large number of terminals. There are grooves in end faces of the boards so as to define marginal lands which are engaged by the clips. The lands of adjacent boards form a complete dovetail structure to be gripped by a clip with a self-locking action. The contiguous faces of adjacent boards may have locating means such as pins and recesses. The boards may have spigots protruding from them for connection with piping. Venting ports are provided with muffler caps.

11 Claims, 14 Drawing Figures

MOUNTING BOARD FOR FLUID POWER COMPONENTS

BACKGROUND OF THE INVENTION

The invention relates to a mounting board with means for conducting and distributing fluid under pressure to components on it.

Such mounting boards are employed as parts of hydraulic or pneumatic circuits where they serve to produce standardized terminal connections. More especially they are connected with sources of fluid under pressure and with loads requiring such fluid. They may be fitted with components such as valves. The mounting boards may be joined together in rows in a modular fashion and then constitute large units with a large number of terminals. Such a large unit may more especially be a valve array with each mounting board carrying one valve for controlling one connection to a load.

The present invention is more particularly concerned with producing the mechanical link between the mounting boards which are fitted together in the form of a fluid distributing unit. In the prior art tie rods have been used which extend through holes in the mounting board and are tightened with the effect of screw joint for this purpose. This involves various disadvantages. The fitting of a screw connection is an elaborate assembly operation only possible with special tools which are not always available. The tie rods themselves are long and waste space and have to be individually cut to suit the size of the assembly so that a large stock of rods with different lengths has to be maintained. Once it has been assembled it is not readily possible to enlarge upon a unit, as for example in the form of a valve array, by adding further mounting boards. Lastly, it is hardly feasible to detach a single mounting board from a large array, if it is in the middle of the array, without releasing all other mounting boards in the group so that such systems are not flexible in application and modifications are complex and likely to cause leaks.

SHORT OUTLINE OF THE INVENTION

One purpose of the present invention is to overcome such disadvantages of the prior art.

A further object of the invention is to devise a mounting board that is simple to produce and assemble.

As a still further aim, the invention seeks to provide low-cost mounting boards which, using a simple and cheap technique, may be joined together to form large units with the possibility of removing separate mounting boards therefrom.

In order to achieve these or other objects in the invention, the mounting boards are adapted to be joined together by clips acting on contiguous mounting boards and spanning a contact surface therebetween.

The invention creates a screw-free connection between each member of a pair of consecutively arranged mounting boards, it being possible to use an identical clip as a connecting means independently of the number of mounting boards. The clip may be put in place and detached very simply. In this way it is possible to build up a chain of mounting boards which may be separated at any desired position and then extended in both directions.

The clips may be such that they are slipped onto the mounting boards, which have oblique joint surfaces and in which suitable oblique flanks of the clips are secured to constitute a positively interlocking clamping connection. Owing to the oblique surface of the interengaging means, the adjacent mounting boards will be powerfully forced together when the clips are pushed on. The result is then a mechanically very strong and highly stable connection with a reliable sealing effect between the mounting boards. A further effect achieved is that the clips are self-lockingly secured on the mounting boards.

In accordance with a further development of the invention there is at least one groove in one end surface of the mounting board extending transversely in relation to the surface of the mounting board that is contiguous with the adjacent mounting board, the groove being so made that a marginal land, with a flank inclined in relation to the contiguous surface, is formed so that the clip may engage the land. In this form of the invention the flanks of the clip take up positions sunk into the groove. The clip only projects a small amount from the surface of the mounting board and the result is a highly compact structure without sharp outer edges. The provision of the groove is a simple economic matter if the mounting board is made of synthetic resin.

The groove may have a flat floor that is parallel to the end surface of the mounting board and the flanks of the marginal land may be at an acute angle to this groove floor. It is more especially preferred to design the marginal land as a half side of the widening dovetail configuration onto which the clip may be slid from the narrow end. The dovetail configuration ensures a particularly strong anchoring effect for the clip which fits around the marginal land. There is then no chance of the clip being pulled off in a direction normal to the end surface of the mounting board.

At the corner of the mounting board, preferably on its side on which components are to be mounted, it is possible to have recesses merging with the grooves at the narrow side of the marginal lands. Such recesses facilitate putting the clips onto the marginal lands, more particularly if the component side of the mounting board is occupied. They may be so dimensioned that the fitted clips are generally in the middle on the end surface of the mounting boards so that the force acts without any tilting on twisiting moment.

It is possible to arrange an assembly hole in the mounting board so that it ends at the floor of one of the recesses so as to divide the land and the groove. The recess is then suitable to receive the head of an assembly screw, which assumes a position under the component carrying surface of the mounting board where it will not obstruct the mounting of components such as valves.

As part of a further development of the invention the grooves and the marginal lands are respectively placed on two sides of mutually opposite end surfaces of the mounting board, or to put it differently, they are placed at all four corners of the mounting board. The consequence is then the possibility of clipping adjacent mounting boards on both sides so that there is an even transmission of force and surface pressure with a very high clamping force. Furthermore, it is possible for mounting boards to be connected on both sides to any desired extent.

The alignment of adjacent mounting boards may be facilitated by providing locating means on the abutment surfaces of the mounting boards, such locating parts being more especially in the form of pins and locating openings spaced therefrom for the pin on the adjacent mounting board. If the mounting boards are made of resin it will then be a very simple matter to mold the locating means thereon. Such locating means predetermine the relative positions of the mounting boards so that the overall structure is more readily appreciated and confusion of the terminals prevented in advance.

In accordance with the basic form of the marginal lands, it is possible for the clips used in the invention to basically have the form of a dovetail widening in the length direction. In this connection the clips may have a flat back with the form of a trapezoid in plan and two wings bent to each side, such wings being bent towards each other following the edge and of the trapezoid-like back and making an acute angle with the back. The clips will then thus have the form of a double wedge, which on the one hand ensures a high surface pressure between adjacent mounting boards when the clip is pushed on, and on the other hand makes sure that the clips are securely anchored on the mounting boards. The clips may be quite simply produced, as for example by bending sheet metal.

In accordance with a preferred further development of the invention, there is a lug bent at about 90° at the narrow end of the clip back, such lug more especially being placed at the side of the back remote from the wings. This lug facilitates handling the clip. It is possible to conveniently hold the clip when it is being mounted or being removed; if desired it may be struck with a tool as for instance a small hammer, on the top or lower side of the lug to drive it home. In the fitted condition of the clip the lug protrudes forwards from the surface of the mounting board so that it is quite readily accessible.

The mounting board in accordance with the invention may be made by injection of material into a mold such as more especially injection molding of plastic, it being best for end spigots for connection with flexible tubing to be made directly by the injection molding process. The number of production steps is therefore minimized and the spigots or male connection elements are made in a very robust form with a fully satisfactory sealing connection with the mounting board member.

For the production of a mounting board with a port for the direct release of compressed air into the atmosphere the invention provides a muffler cap over such venting port and held in place by a part thereof snap-fitting into the said port.

The locking or detent means for producing such a snap connection may be quite simply produced integrally with the mounting board member and there is no need to provide a separate thread connection for the muffler. Such a snap action connection is furthermore sturdy and is capable of withstanding substantial forces or pressures acting on the muffler.

Further features and advantages of the invention will be able to be gathered from the ensuing account of one working embodiment thereof referring to the accompanying drawings,, which in part are diagrammatic.

LIST OF THE SEVERAL VIEWS OF THE DRAWINGS

FIG. 7 shows a section taken through the mounting board of

Figure 6:
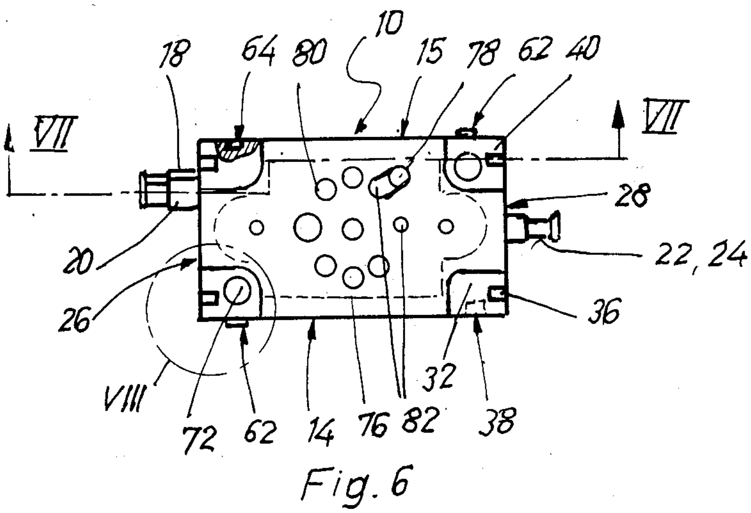
FIG. 6 is a view looking down onto the component carrying surface of the mounting board of FIG. 5 with the eye looking in the direction VI.

FIG. 6 on the section line VII—VII.

Figure 8:
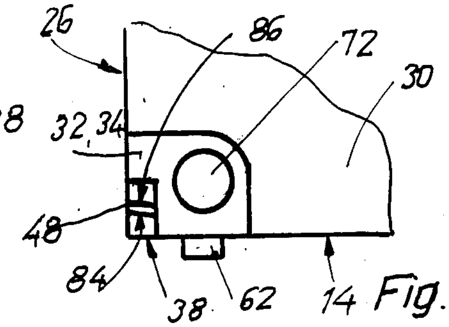

FIG. 8 shows part of the mounting board of FIG. 6 on a larger scale.

Figure 2:
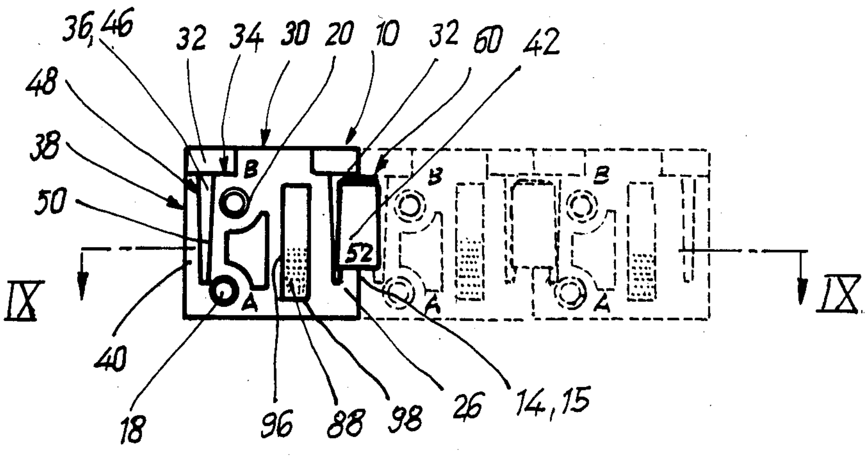
FIG. 2 is a front end view of the assembly of mounting boards looking in the direction II in FIG. 1.
Figure 4:
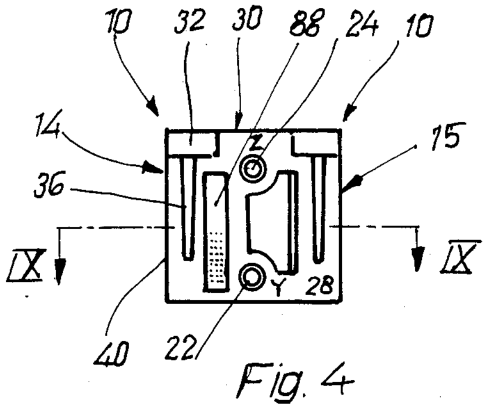
FIG. 4 is a view of the back side of a single mounting board looking in the direction IV as indicated in FIG. 1.
Figure 9:
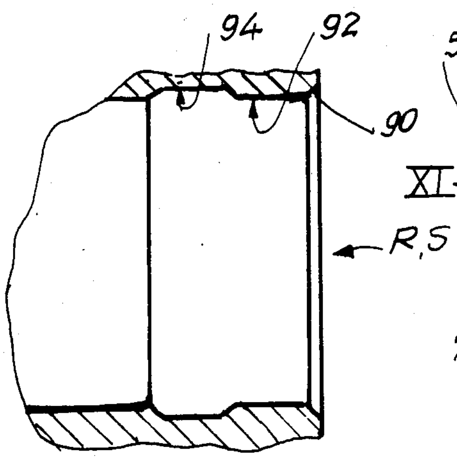

FIG. 9 is a section on a larger scale on the line IX—IX of FIG. 2 or FIG. 4 to show the venting port, but after removal of the muffler cap, to be seen in such figures.

Figure 10:
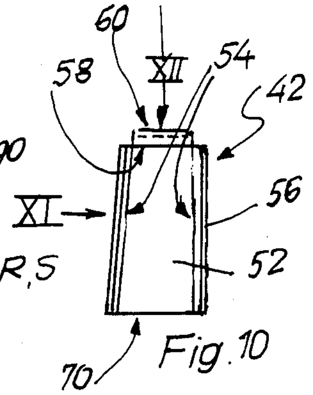

FIG. 10 is a view of the back of a clip as used in the present invention.

Figure 11:
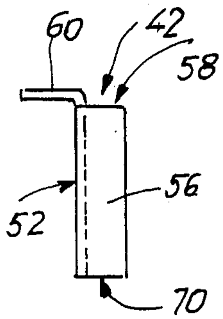

FIG. 11 is a side view of the clip, this time looking in the direction XI of FIG. 10.

Figure 12:
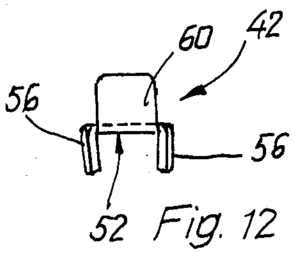

FIG. 12 is a view looking down onto the narrow side of the clip as viewed in the direction XII of FIG. 10.

Figure 13:
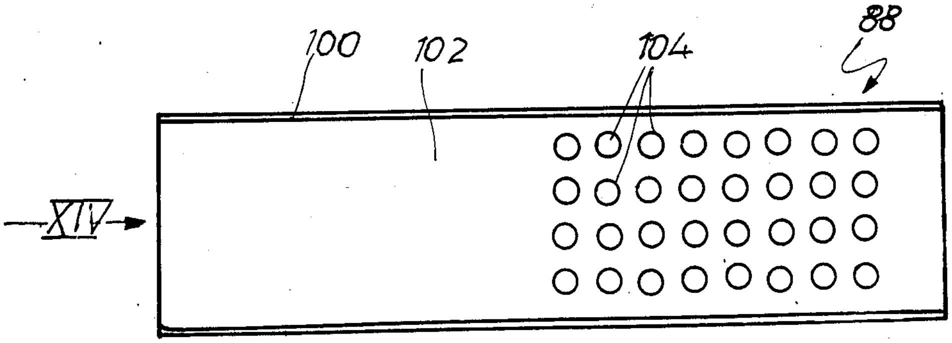

FIG. 13 is a view from above on a larger scale of a muffler cap.

Figure 14:
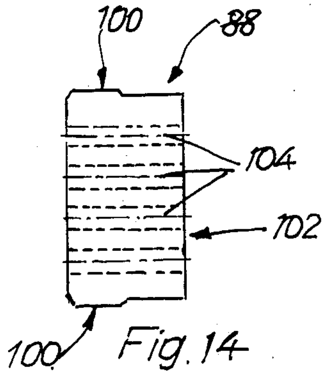

FIG. 14 is a side view of the muffler cap looking in the direction XIV of FIG. 13.

DETAILED ACCOUNT OF WORKING EMBODIMENTS OF THE INVENTION

Figure 1:
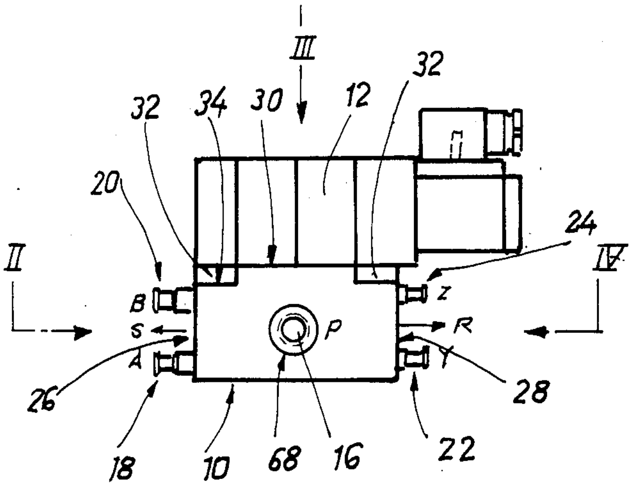
FIG. 1 is a lateral view of an assembly or unit made up of mounting boards which are fitted with valves, such valves are not shown in the following figures.

FIG. 1 is a side view of a mounting board 10 which has been fitted with a valve 12. An array of valves placed in a row has generally the same appearance, such valves being mounted in a number of identical mounting boards 10 which with the valves 12 mounted thereon are also in line with each other. The mounting board 10 has an essentially block or parallelepiped form. It has a mating surface 14 to be placed against the mating surface 14 of a directly consecutive or contiguous mounting board 10 of the valve array. In the middle of the mating surface 14 there is a pressure supply port P at one end of a driving fluid duct 16 which extends through the valve array and has a large bore diameter. Terminals for connections A, B on the one hand and Y, Z on the other hand extend from the mounting board 10 in a direction which is transverse in relation to the fluid duct 16. The load terminals have the form of spigots 18, 20, 22 and 24 projecting from both sides of a respective front end surface 26 and a back end surface 28, which are normal to the mating surface 14, of the mounting board 10. On the front end surface 26 there are spigots 18 and 20 for the load terminals A and B while on the back end surface 28 there are spigots 22 and 24 for the load terminals Y and Z.

The flow of fluid through the load terminals A, B, Y and Z is controlled by the valve 12 which may be a conventional solenoid multi-way valve. In accordance with the condition of the circuit at any given instant one or more of the load terminals A, B, Y and Z are connected with the supply duct P and other load terminals A, B, Y and Z will be vented. The mounting board 10 is used more especially in pneumatic circuits for supplying compressed air to loads. After expansion the compressed air may be let off directly into the atmosphere, and for this purpose the mounting board 10 has venting ports R and S with the venting port R on the back end surface 26 of the mounting board 10 and the venting port S on the front end surface 26 of the mounting board 10.

The valve 12 is mounted on a component carrying surface 30 of the mounting board 10 which is normal in relation to the mating surface 14 and the end surfaces 26 and 28 and will usually form the upper side of the mounting board 10 or of a valve array. At each of its four corners the mounting board 10 has a recess 32 at the same level as the component carrying surface 30 and the recess 32 has a flat floor 34 that is plane-parallel to the component carrying surface 30.

Figure 3:
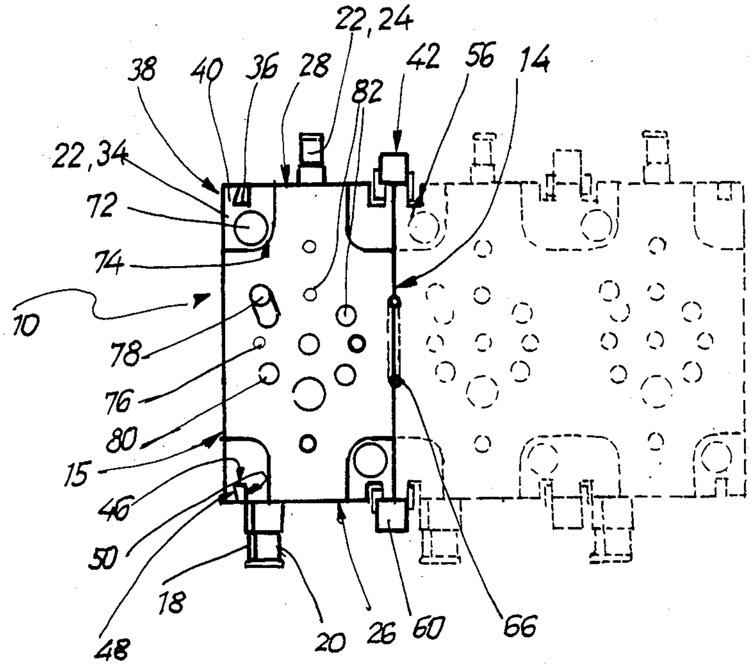
FIG. 3 is a view looking down onto the component carrying surface of the mounting board unit looking in the direction III as marked in FIG. 1.

Referring now to FIGS. 2 through 4 it will be seen that a groove extends from each recess 32 in the end surface 26 and 28 of the mounting board 10. The groove 36 runs along at a small distance from the edge 38 of the respective adjacent mating surface 14. It divides a marginal land 40 from the rest of the mating surface 14 and as shown in FIGS. 2 and 3 and it will be seen that a clip 42 engages this land 40. This clip serves for connecting together a pair of adjacent mounting boards 10. Lateral wings 56 of the clip 42 fit in the groove 36.

This groove 36 has a flat groove floor 46, which runs parallel to the end surface 26 and 28, and two groove sides 48 and 50 of which the groove side 50, remote from the mating surface 14, runs generally parallel to this surface 14, whereas the side 48 of the groove nearer the mating surface 14 extends in two directions and at an oblique angle. As will be seen from FIG. 2, the groove side 48 is firstly so inclined that the marginal land 40 initially becomes broader in a direction away from the component carrying surface 30. At the level of the recess 32 the land 40 is at its narrowest. It is wedge-like and becomes broader steadily towards the end of the groove 36 which accordingly becomes narrower. As will be seen from FIG. 3, the groove side 48 adjacent to the mating surface 14 is at an acute angle to the groove floor 46. The marginal land 40 thus forms one side of a dovetail. If two mounting boards 10 are placed together along their mating surfaces 14 the marginal grooves will now together form a complete dovetail structure, whose breadth decreases away from the component carrying surface 30.

A clip 42 with a matching, widening dovetail form and placed at the component carrying surface 30 is now pushed onto this dovetail formed by the grooves. It will be seen from FIGS. 10 through 12 that the clip 42 has a flat back 52, with the outline of a trapezoid with side edges 54 set at equal angles. Along the edges of the back in the form of a trapezoid two wings 56 are bent out of the plane of the back 52. The wings 56 extend to the same side of the back 52 and they are aligned with the oblique side edges 54 of the back with the form of a trapezoid and diverge away from the narrow side 58 of the back 52 so that there is a corresponding broadening of the clip 42. In addition to making such an oblique angle in the length direction the wings 56 are at respective acute angles to the back 52 so that the clips have the form of a dovetail bail with a breadth increasing in the length direction.

On the narrow side 58 of the back 52 there is a lug 60 bent at an angle to the back. The lug 60 has a generally square outline with rounded corners and is generally at a right angle to the back 52 and projects to the side of the back which is opposite to the wings 56. The lug 60 functions as a handle which may be used as a convenient means of holding the clip 42. Furthermore the lug 60 may be struck on its upper or lowre side with a suitable tool in order to drive the clip 42 onto two adjacent mounting boards 10 or to detach the clip 42 from such mounting boards 10.

The clip 42 may be produced quite simply and cheaply from sheet metal in a single piece. A flat blank is stamped to produce the wings 56 and the lug 60 in a simple bending operation.

Figure 5:
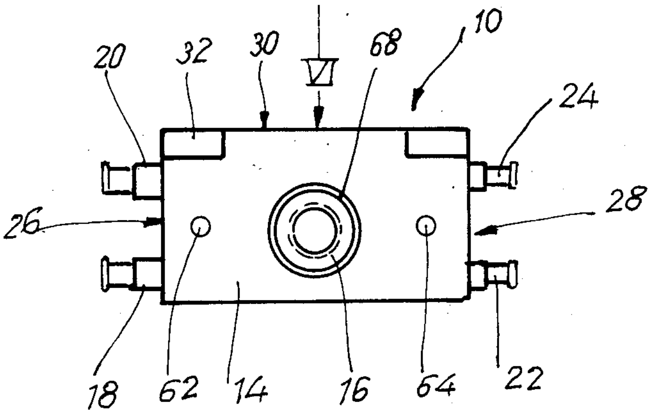
FIG. 5 is a side view similar to that of FIG. 1 of a mounting board to show further details of its design.

Reverting now to FIGS. 2 and 3 it will be seen that grooves 36 and dovetail marginal lands 40 are placed on both sides on the two end surfaces 26 and 28 of the mounting board 10, i.e. at all four corners of the component carrying surface 30. In order to unite mounting boards 10 to form a large fluid distribution assembly, as for instance in the form of a valve array, clips are therefore driven in at the two end surfaces 26 and 28. Two mounting boards 10 are placed together with their left and right mating surfaces 14 and 15, respectively, in contact and they are aligned, for which purpose it is an advantage to have complementary locating means on the component carrying surfaces 14 and 15, such means being shown in detail in FIGS. 5 and 7. On the one component carrying surface 14 of the mounting board 10, as for example the right one in the figures, there is a pin 62 on the one side of the fluid duct 16 closely adjacent to the front end surface 26 and about half way up the mating surface 14, whereas on the other side of the fluid duct 16 just in front of the rear end surface 26 and at the same level there is a locating opening 64. On the other mating surface 15; thought of as being the left surface of the mounting board 10, the arrangement is exactly the reverse with a reversal of the pin 62 and the locating opening 64. The pins 62 and the locating openings 64 are therefore in a diagonally opposite arrangement on the mating surfaces 14 and 15. On assembling adjacent mounting boards 10 the pin 62, on the one mating surface 14 and 15, fits with a positive locking effect in the locating opening 64 on the other mating surface 15 and 14 so that, owing to the close fit, an aligned assembly of the mounting boards 10 is assured. At the same time adjacent mounting boards 10 are held together by a sort of male and female joint until they are put in position. The pins 62 and the locating openings 64 may with advantage be made integrally with the mounting boards 10 by molding, more especially by injection molding of plastic. It will however be clear that for the desired alignment of male and female connections between adjacent mounting boards 10 it will be possible to have other positive fitting means if desired. Since the left and right mating surfaces 14 and 15 are different the mounting board 10, in accordance with the invention, is well suited to the assembly of a large distribution unit since the mounting boards may not be turned around. It is easier for the user to see the correct orientation inasfar as the spigots 18, 20, 22 and 24 are placed eccentrically on the end surfaces 26 and 28 of the mounting board 10. In addition to this the spigots 18 and 20 on the front end surface 26 have a larger diameter than the spigots 22 and 24 on the rear end surface 28.

On fitting together the mounting boards 10 the pressure fluid ducts 16 are in a line that comes to an end at the two mating surfaces 14 and 15. The respective pressure ports P are sealed using O-rings 66 (see figure). The O-rings 66 are placed in an annular groove 68 (see FIG. 5) placed around the pressure port P. On clamping together adjacent mounting boards 10 the O-rings 66 are compressed against the mating surfaces 14 and 15 and deformed to seal the connection. The result is thus a continuous fluid duct 16 with a large bore diameter for the supply of the different load terminals A, B, Y and Z of the different mounting boards 10.

Reverting to FIGS. 2 and 3, the reader will be able to see how adjacent mounting boards 10 are fixed together after alignment and after insertion of O-rings 66. The clips 42 are pushed into place from the component carrying side 30 with their broad ends 70 first so as to fit over the adjacently placed marginal lands 40 of the adjacent mounting boards 10. As already mentioned, these marginal lands 40 together form a dovetail structure on which the clip 42, that is also made with a dovetail form, will fit. The clip 42 is pressed down by acting on the lug 60. When this is down the wings 56 of a clip 42 act on the oblique sides of the marginal lands 40 so that the adjacently placed mounting boards 10 are moved towards each other. In this way the downward motion of the clip 42 is converted by the oblique setting of the sides of the land into a transverse thrust acting on the mounting boards 10 which are accordingly pressed together. At the same time the wings 56 come to take up positions under marginal lands 40, owing to their dovetail form, so that it is not possible for a clip 42 to slip off the end surfaces 26 and 28. The clip 42 may in fact be removed by light blows on the lug 60 so that the wedging effect is removed. In its end position the clip 42 is interlocked with the marginal lands 40 and there is a self-locking effect holding the clip on the lands 40. The lug 60 stands out from the end surfaces 26 and 28 so that it is quite accessible for affixing or removing the clip 42.

The recesses 32, with which the grooves 36 merge, facilitate the insertion of the clips 42. The latter engage the structure at a level at which their narrow end 58 with the lug 60 is at a certain distance under the component carrying surface 30. As a result the clips 42 may be readily fixed in place even if a component as for example a valve is arranged on the component carrying surface 30. As will be seen from FIG. 3 the area of the recesses 32 is substantially larger than the cross section of the groove 36. On the floor 34 of two diametrically opposite recesses 32 there are the outer ends of assembly holes 72 which extend through the mounting board 10 in a direction perpendicular to the component carrying surface 30. Details of the arrangement of the assembly holes 72 may be seen from FIG. 7, which shows the mounting board 10 sections at an assembly hole 72. The assembly hole 72 is at a corner of the recess 32. As made clear in FIG. 3, the latter is here limited by a rounded edge surface 74, which runs concentrically in relation to the assembly hole 72.

Figure 7:
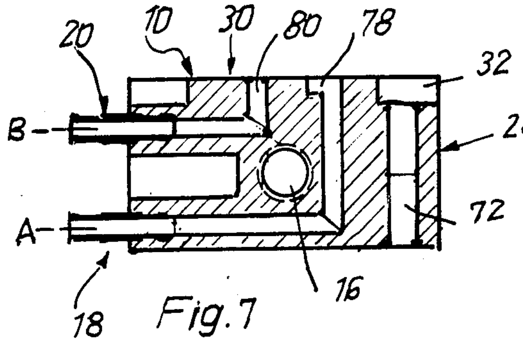

There are threaded holes 76 on the component carrying surface 30, in which a component such as a valve, mounted on the surface 30 may be screwed. Furthermore there are various connection ports 78, 80 and 82 which communicate in some suitable way with the pressure fluid duct 16, the load terminals A, B, Y and Z and the venting ports R and S. The valve 12 mounted on the component carrying surface 30 produces the desired switchable connections between the various terminals. The flow paths are not shown in detail. FIG. 7 shows the connection between the spigot 18, which is connected with the load terminal A, and a connection port 78 only by way of example; the opening end of the port 78 is widended out as an oblique slot. The flow path between the spigot 20, which is connected with the load terminal, and a further connection port 80 of the component carrying surface 30 is to be seen as well. The flow paths are in each case produced by two blind holes which intersect at a right angle at their deepest points in the body of the mounting board 10. The spigots 22 and 24 connected with the load terminals Y and Z are joined up in a similar way which is not shown.

All the spigots 18, 20, 22 and 24 are manufactured as separate components and their anchoring ends are embedded in the material of the mounting board. If the mounting board 10 is made by injection molding. more especially using plastic, it is to be preferred to mold the spigots 18, 20, 22 and 24 directly in the mounting board 10. The result is then a composite structure which is mechanically very sturdy and is perfectly fluid tight.

FIG. 8 shows a detail to make clear the inclination of the marginal lands 40 once again. It will be possible to see the upper edge 84 and the lower edge 86, of the oblique groove side 48 parallel to it, which form the limit of the widening marginal land 40. The figure also serves to show the relative position of the groove 36, the assembly hole 72, the pins 62 and the outline of the recess 32.

As made clear by FIGS. 2 and 4 the venting ports R and S on the two end surfaces 26 and 28 of the mounting board 10 are each shut off by a muffler cap 88. They are secured in position on the venting ports R and S by a snap or detent connection.

The venting ports R and S have a rectangular cross section. As will be clear from FIG. 9 their outer borders are slightly chamfered at 90 in order to facilitate the introduction of the respective muffler caps 88. At some distance from the end of the port there are recesses 94 in the inner surfaces 92 of the venting ports R and S which have a trapezoid-like cross section. The recesses 94 extend on both sides of the venting ports R and S over the full broad side 96. On the other hand on the narrow end 98 of the venting ports R and S the inner bore surface is flat and smooth.

The muffler cap 88 has the same elongated rectangular form as the venting port R or S which it fits. As will be seen from FIGS. 13 and 14 in its rear part fitting into the venting ports R and S there are molded heads 100 which have a trapezoid-like cross section. On insertion of the muffler cap 88 into the venting port R and S the heads 100 snap interlockingly into the recesses 94, the thickness of the muffler cap 88 being so selected that its front side 102, remote from the heads 100, is aligned with the end surface 26 and 28 of the mounting board 10.

There is a large number of air discharge holes extending through the muffler cap and they are arranged in a chequer board pattern. Approximately half the surface of the muffler cap 88 is occupied by air discharge openings 104, which have a very small cross section so that the spent air excapes slowly as it is released into the outside air and only a slight degree of noise is produced.

The snap connection in accordance with the invention for the muffler cap 88 is very practical from the manufacturing point of view, more especially if the mounting board 10 is made of injection molded plastic. The muffler caps 88 may be quite simply and quickly fitted. The detent connection may not be released from the inside and will resist considerable pressures of the spent air.

It is also to be added that grooves 36 on the broad side of marginal lands 40 are in the form of blind grooves. This is a simple way of limiting the depth to which the clips 42 may be inserted. When fitted, the clips 42 are about half way up the end surfaces 26 and 28 so that the surface pressure on the mating surface 14 between adjacent mounting boards 10 is very even.

We claim:

1. A mounting board combination with connecting means for connecting the mounting board to another similar mounting board, the mounting board being for distribution of a fluid under pressure and adapted to be connected to at least one source of fluid under pressure and at least one load, the combination comprising the mounting board having a component carrying surface (30) adapted to receive at least one fluid power component, the mounting board having a mating surface (14) for engagement with a mating surface of another mounting board when the mounting boards are connected together by the connecting means, and opposite end surfaces (26, 28) extending transversely to and on opposite sides of said mounting surface, a blind groove (36) in each end surface of the mounting board, each defining an oblique face (48) which forms half of a dovetail with an oblique face of the other mounting board when the mating surfaces of the mounting boards are engaged against each other, each groove defining a marginal land (40) between said groove and said mating service and opening into said component carrying surface, each oblique face being inclined so that the dovetail widens in a direction away from said component carrying surface, and a clip (42) engaged with each oblique surface and engageable with an oblique surface of the other board for holding the mounting boards together, each clip spanning said mating surface, each clip having a U-shaped cross section in a plane parallel to said component carrying/surface with a back portion (52) and a pair of wings (56) connected to outer edges of said back portion, said back portion having the shape of a trapezoid and lying in a plane substantially perpendicular to said mating surface parallel to said end surfaces, said wings lying at acute angles to said back portion and being inclined toward each other in a direction away from said back portion whereby each clip is engageable with its oblique face in a direction perpendicular to said component carrying surface and one of said wings embraces said oblique surface for retaining said clip on the dovetail when the mounting boards are engaged with each other, the other wing being for embracing an oblique face of the other mounting board, said back portion having a narrow side (58) adjacent to said component carrying surface (30) when said wings are engaged with said oblique surfaces, each clip including a lug (60) projecting at about 90° to said back portion and connected to said narrow side of said back portion, said lug projecting in an opposite direction from said wings of said back portion.

2. The mounting board as claimed in claim 1 wherein said groove possesses a flat floor (43) running parallel to the end surface of the board and the side surface of the marginal land is at an acute angle to the floor of the groove.

3. The mounting board as claimed in claim 1 wherein at least one corner of the said mounting board is provided with a recess having said groove extending at a narrow side of the marginal land.

4. The mounting board as claimed in claim 3 wherein an assembly hole extends therethrough and ends at the said floor of such recess.

5. The mounting board as claimed in claim 1 comprising locating means for the mutual alignment of two such mounting boards when putting same together.

6. The mounting board as claimed in claim 5 wherein said locating means comprise a finger and a recess spaced therefrom for the finger of an adjacent mounting board.

7. The mounting board as claimed in claim 1 made of injection molded material and having injection molded spigots thereon for making connections with piping.

8. The mounting board as claimed in claim 1 designed for use with compressed air components and having a venting port for the discharge of spent air which is furnished with a covering cap-like muffler.

9. The mounting board as claimed in claim 8 wherein said cap-like muffler comprises a cover plate having an elongated rectangular form like such venting port in which it fits in flush manner, said muffler having fine air escape holes therein which have a minute cross section and are arranged in accordance with a chequer board pattern.

10. The mounting board as claimed in claim 9 wherein heads are formed on such cover plate and are able to fit with a positive locking effect in recesses of said venting port and a front side, facing away from said heads, of the muffler is coplanar with the mounting board.

11. The mounting board as claimed in claim 8 wherein said muffler is made of resin material by injection molding.

* * * * *